United States Patent [19]
Hoiberg

[11] Patent Number: 5,543,678
[45] Date of Patent: Aug. 6, 1996

[54] FLAT MOTORS

[76] Inventor: Dane A. Hoiberg, 402 Fallingstar, Irvine, Calif. 92714

[21] Appl. No.: 60,415

[22] Filed: May 11, 1993

[51] Int. Cl.$^6$ .................................................. H02N 7/00
[52] U.S. Cl. ............................ 310/307; 310/37; 310/306
[58] Field of Search ..................................... 310/306, 307, 310/26, 37, 83, 268; 60/527

[56]  References Cited

U.S. PATENT DOCUMENTS

| 4,536,669 | 8/1985 | Morishita | 310/307 |
|---|---|---|---|
| 4,665,334 | 5/1987 | Jamieson | 310/306 |
| 5,296,775 | 3/1994 | Cronin | 310/309 |
| 5,306,979 | 4/1994 | Schwarz, Jr. | 310/26 |

OTHER PUBLICATIONS

Dieter Stoeckel, "Shape–Memory Alloys Prompt New Actuator Designs," *Advanced Materials & Processes*, Oct. 1990, pp. 33–38.

*Primary Examiner*—R. Skudy
*Attorney, Agent, or Firm*—Merchant, Gould, Smith, Edell, Welter & Schmidt

[57]  ABSTRACT

A flat motor. The flat motor comprises a substrate, a cantilevered, resilient lever arm mounted, by a passive end, on the substrate; and a shape-memory transducer acting on the lever arm wherein movement of the transducer deflects the lever arm.

11 Claims, 11 Drawing Sheets

Fig. 7-a
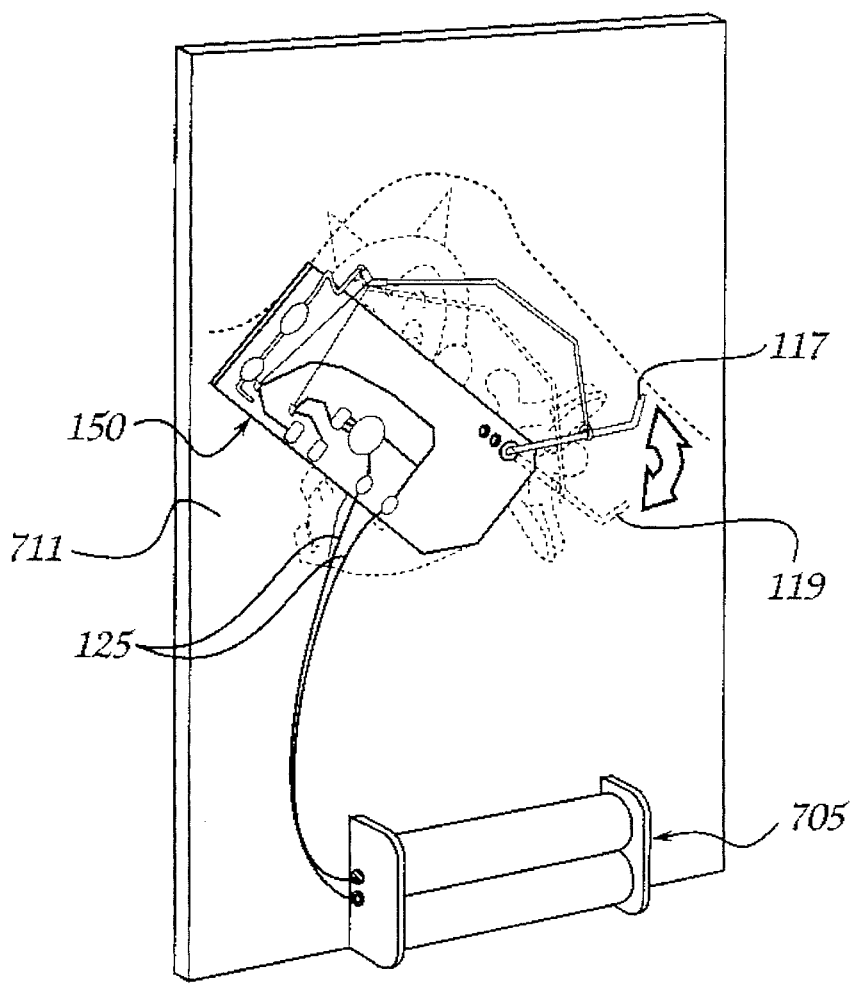
Fig. 7-b
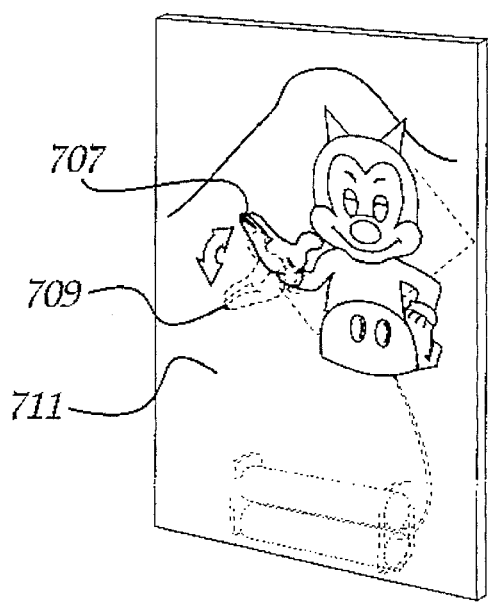

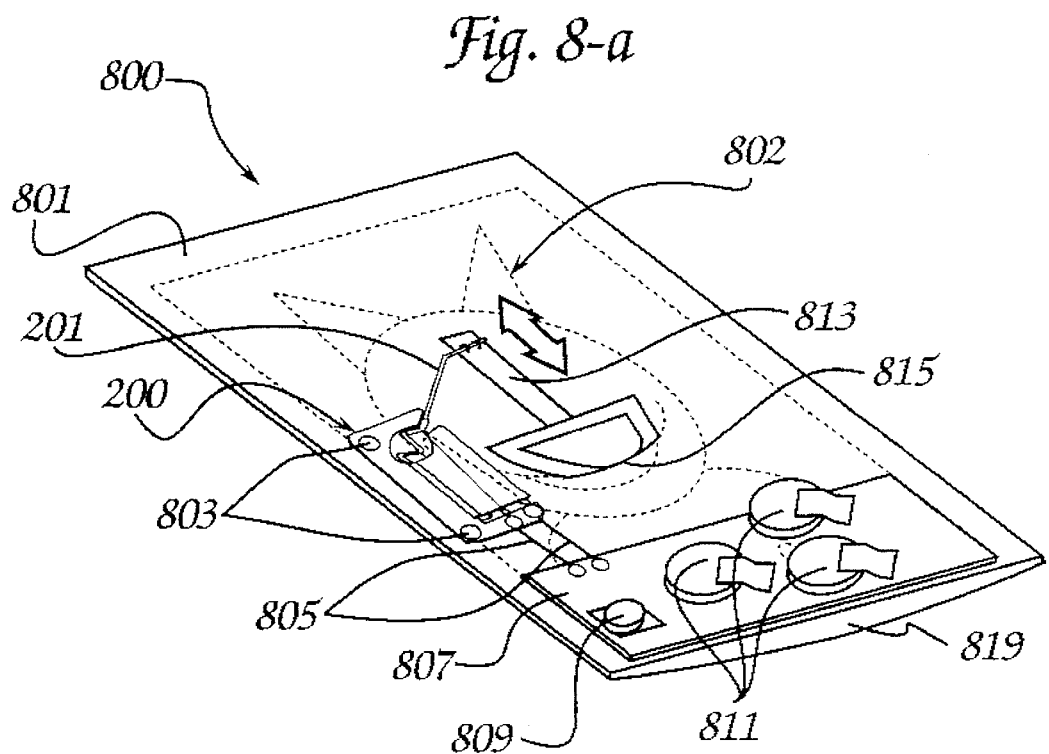
Fig. 8-a
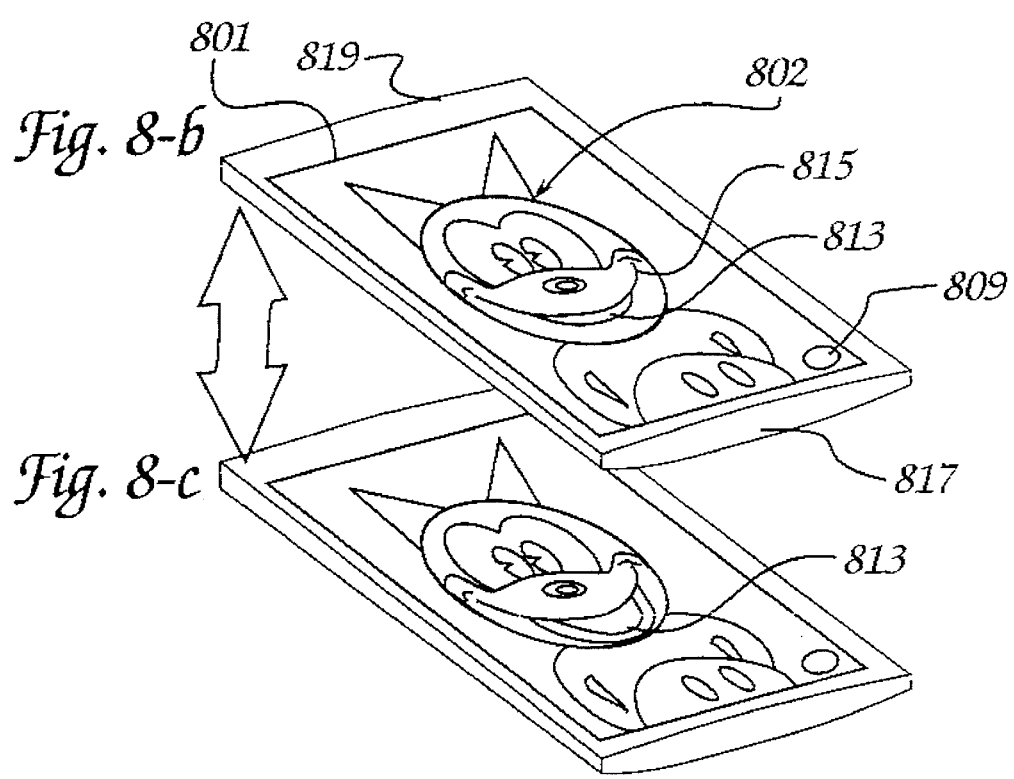
Fig. 8-b
Fig. 8-c

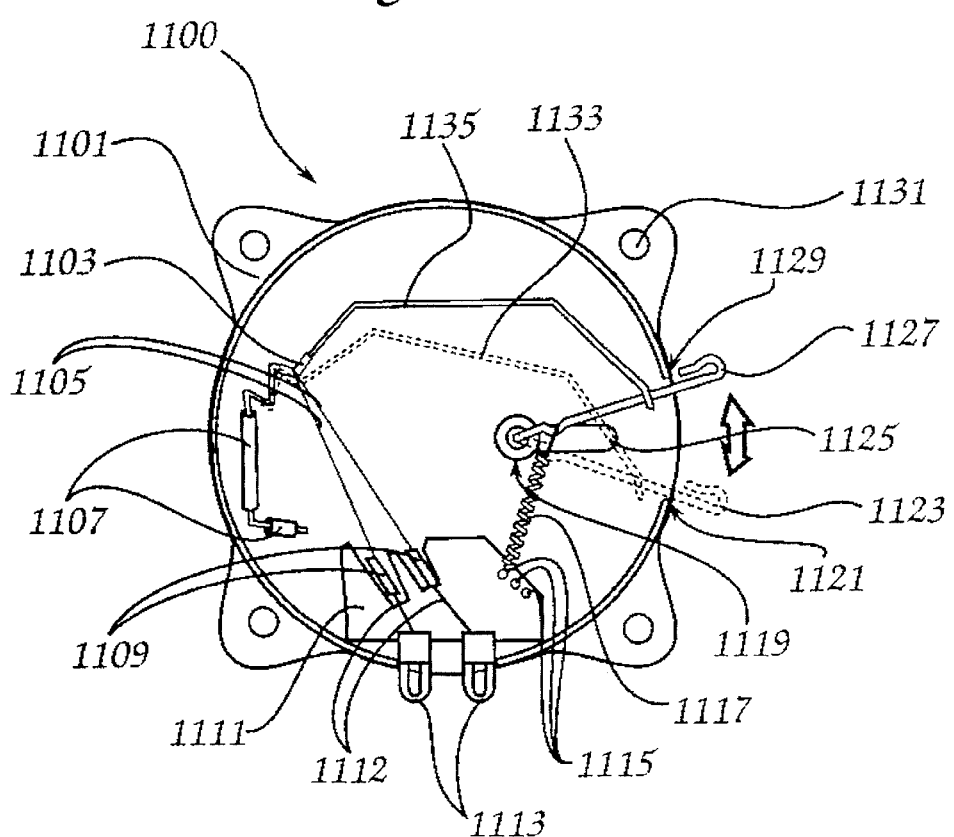
Fig. 11-a
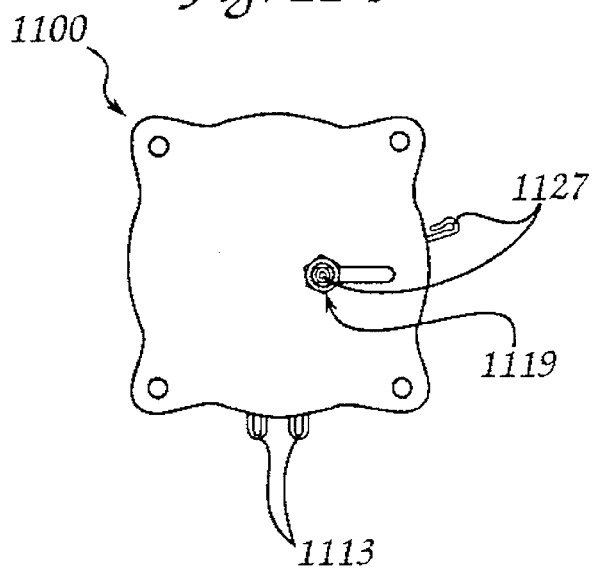
Fig. 11-b
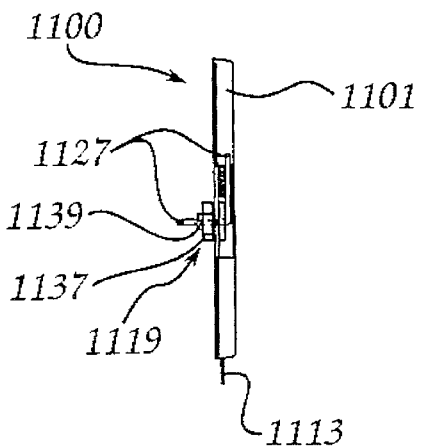
Fig. 11-c

FLAT MOTORS

FIELD OF THE INVENTION

This invention relates generally to thermal motors, more particularly, to flat shape-memory-material-driven motors or devices.

BACKGROUND OF THE INVENTION

Much of the work in the creation thermal motors has focused on mechanisms which exploit actions, or movements, which occur when thermal materials such as bi-metals, or shape-memory alloys are successively warmed and then cooled.

Some mechanisms have been aimed at replacing the functions of electromagnetic motors, actuators or solenoids, particularly in situations which require compact size or relative low-weight. In part, such devices have attempted to exploit the advantages of devices made using thermal materials which, while providing equivalent force, can often be lighter or smaller than conventional electromagnetic motors or solenoids with bulky windings and heavy magnets or cores. These devices have often employed bi-metals or memory-metal wires, springs, rods or strips which, when heated, move a rigid, pivoted lever or gear. Then upon cooling of the thermal material, the rigid lever, or gear, is returned to starting position by a biasing means-often a conventional extension spring-acting opposite to the thermal material's direction of force. In some of these devices, memory-metal actuator wires, functioning as transducers, are ohmically warmed using electric current as a power source and ambient air as the cooling means.

A further refinement of such devices occurred with the addition of electronic circuits which could control the timing of electric currents activating the shape-memory transducers. Still further improvements occurred with the development of devices employing secondary levers or gears to amplify and transform relatively small movements of the bi-metal or memory-metal transducers in mechanical assemblies.

While such devices provide some measure of usefulness, nearly all are application specific, i.e., in nearly all cases, new mechanisms must be designed "from the ground up" for each particular end use. In comparison, readily-available "off-the-shelf" electromagnetic motors and solenoids enable designers and engineers to quickly develop a multiplicity of mechanisms to suit an individual task or application.

Moreover, many devices employing thermal materials have been relatively difficult and expensive to manufacture. For example, devices employing pivoted levers, gears or other rigid elements connected to memory-metal actuator wires often must be made with exacting part tolerances since small mismatches (e.g. "backlash" between gears, or pivots and pivoting members) would otherwise waste much of the shape-memory materials' short "stroke," which is typically only 3 to 7 percent of active length. Additionally, many devices provide essentially fixed torque though out their "power-strokes" when it is desirable to have a responsive capability since it is often necessary to overcome relatively greater force at only start of a cycle or to respond to temporary increase demand for a greater torque for a small part of operating cycle. Consequently, many of the devices have been inefficient in the use of relatively expensive shape-memory-material.

Also, some devices employ separate, costly strain-reliefs to avoid over-stressing or breaking shape-memory elements if mechanism travel becomes blocked or restrained during operation. Other devices make no provision for strain relief at all.

In addition, many battery-powered devices have had limited operating lives. These mechanisms are most often made of rigid moving parts with relatively high mass acted upon by thin, fast-acting memory-metal wires. Consequently, these mechanisms exhibit substantial inertial resistance or fail to absorb the shock of a "power stroke" leading to stress fatigue and breakage of thin actuator wires after relatively few operating cycles.

Therefore, it is desirable to provide improved actuators and motor-like devices which are simple and relatively inexpensive to manufacture and yet can function for extended periods of time in a multiplicity of applications. More specifically, it is desirable to provide simple motors and devices employing cantilevered, resilient, shock-absorbing means in a efficient "pivotless" transducer. It is desirable that such devices be also lightweight and flat while at the same time be resistant to damage when operated, even when mechanism travel is blocked or hindered. Additionally, such devices should be efficient in the use of shape-memory materials and be capable of appropriately varying torque in response to load requirements during device operation.

SUMMARY OF THE INVENTION

The present invention describes a flat motor. The flat motor comprises a substrate, a cantilevered, resilient lever arm mounted, by a passive end, on the substrate; and a shape-memory transducer acting on the lever arm wherein movement of the transducer deflects the lever arm.

In one embodiment of the present invention the active end of the lever arm engages a latch to thereby release the latch when the transducer is activated. In another embodiment of the present invention a electrically conductive strip and a plurality of electrically conductive elements attached to the substrate adjacent to the strip are bridged by a wiper arm to complete an electrical circuit with the memory transducer to thereby move the crank to a preselected position. In another embodiment of the present invention finger arms attached to a bracket, which in turn is attached to the lever arm, engage a sprocket wheel.

BRIEF DESCRIPTION OF THE DRAWINGS

These and other features and advantages of the present invention will be better understood by reference to the following detailed description when considered in conjunction with the accompanying drawings in which:

FIGS. 7-*a*, 7*b* shows perspective view of a preferred embodiment employed in creating animation in a flat display panel or picture in accordance with the present invention;

FIGS. 8-*a*, 8-*b* and 8-*c* show perspective view of a preferred embodiment creating animation in a flat, trading-card-like amusement device in accordance with the present invention;

FIGS. 11-*a*, 11-*b* and 11-*c* show several views of a preferred embodiment of a covered rotary actuator in accordance with the present invention.

DETAILED DESCRIPTION

The present invention relates to flat motor devices. The flat mechanism employs a cantilevered, resilient lever arm, directly driven by a shape-memory transducer.

Shape-memory materials have the property of returning to a pre-set shape from a deformed, often stretched, state on heating and/or with electrical stimulation (the property of "memory"). The force at which the shape-memory-material, on heating, tends to return to pre-set shape is often several times the force required to deform it when "cold." Practical shape-memory materials are generally comprised of metal alloys, but certain plastics or other non-metallic materials also exhibit shape-memory properties and thus may be employed in making force transducers.

For a shape-memory-metal alloy, the transformation temperature—the temperature at which the alloy transitions to its "memory" shape through changes to its internal crystal structure—can be chosen to be anywhere from well above +100° C. to below −100° C. by controlling the alloy content (many are primarily NiTi alloys) during fabrication. Persons skilled in the art will readily recognize that it is necessary to pick the correct material transition temperature in order to ensure the flat motor's action occurs only when desired. As well, nearly all shape-memory-materials exhibit hysteresis with respect to temperature and change of internal structure—this means the materials must cool somewhat, about 30° C. for most NiTi alloys, below their transition temperature before they can again be easily deformed, or stretched, without damage. Further, in order for the assembly to function, as persons skilled in the art will readily understand, the generated force of the shape-memory material must be greater than the total of the friction and other forces resisting the action of the shape-memory material.

Figure 1:
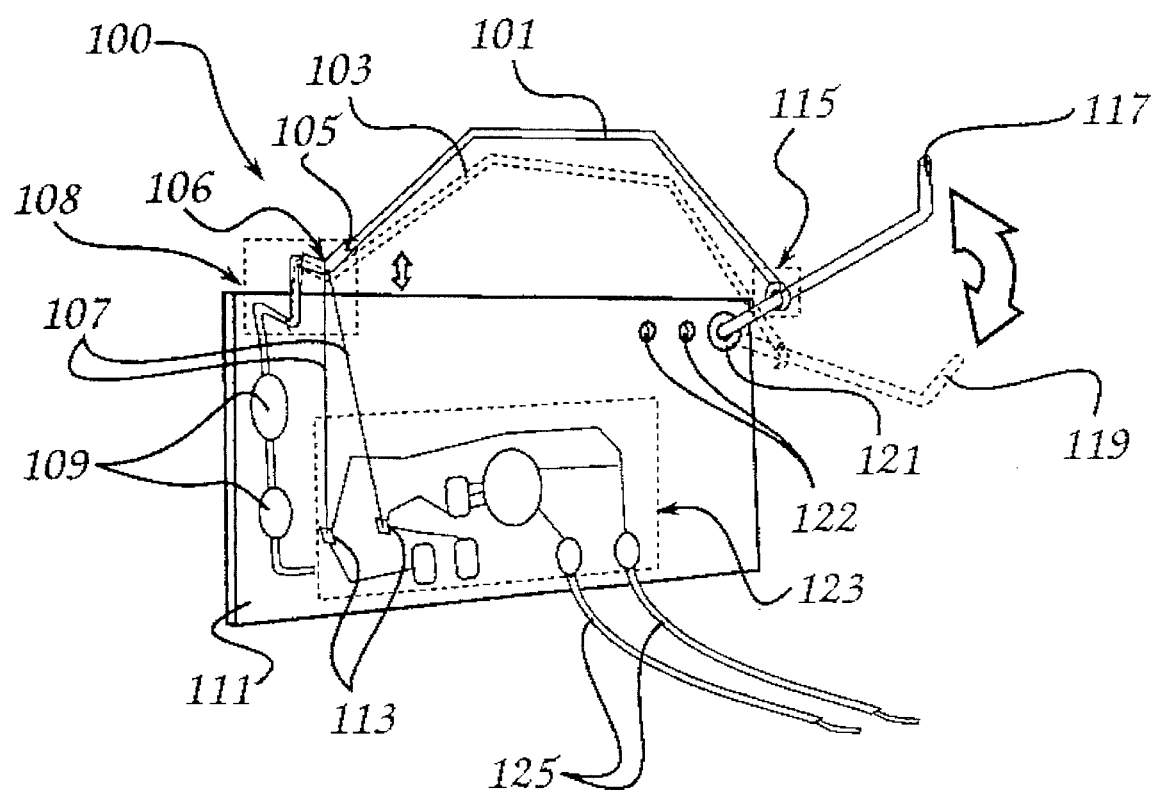
FIG. 1 is a perspective view of a flat, reciprocating, motor in accordance with the present invention.

Referring now to FIG. 1, a flat motor of the present invention is generally designated as 100. More particularly, as a first embodiment of the present invention, a flat, reciprocating motor mechanism, 100, is shown. Motor 100 is fabricated with a cantilevered, resilient lever arm 101 mounted to rigid support structure, 111, preferably a circuit board, by mechanical means or by solder or preferably glue, 109. A preferred mounting glue is cyanoacrylate, available from Radio Shack. A length of memory-metal actuator wire, 107, is looped around a sleeve, 105, which covers a portion of lever arm 101. Crimps, 113, fasten the ends of actuator wire 107 to support structure, or to circuit board, 111. The looped memory-metal wire is tensioned so as to stretch "cold" actuator wire approximately 4 to 5 percent in length as compared to its length under normal load for the wire's diameter. Detailed information about tension and normal load specifications is published and can be obtained from memory-metal wire manufacturers, such as Dynalloy of Newport Beach, Calif.

A portion at the far end of the cantilevered lever arm 101, the designated area 115, loops around crank 117 which is mounted though pivot 121 located on structure 111. Alternative pivot mounting holes, 122, are formed in support structure 111 so that the crank's pivot location can be changed and in turn the extent of crank rotation as well as the amount of torque provided can be adjusted easily. When actuated by a timed pulse of electric current from circuit shown in area 123, memory-metal actuator wire 107 contracts, pulling lever arm 101 to a new position, shown by dotted outline 103. In turn, the looped portion of wire shown in area 115, in contact with crank 117, moves it to a new position shown in dotted outline 119.

Timing circuit shown in area 123 can be constructed from one of a multiplicity of oscillator circuits well known in the art. In addition, support structure 111, preferably a printed circuit board, is constructed by conventional means also well known in the art.

At the cessation of the electric-power pulse supplied by electric circuit shown in area 123, memory-metal actuator wire 107 is cooled preferably by ambient conditions and resilient lever arm 101 acts to deform, or stretch, actuator wire 107. While ambient air cooling is preferred, other alternative cooling means are well known in the art if expected ambient conditions are determined to provide insufficient cooling for desired flat motor operation. Upon actuator wire cooling, lever arm 101 and crank 117 all return back to starting position, ready to begin another cycle. Thus, when electrical leads 125, are connected to a power supply, flat motor 100 will reciprocate back and forth indefinitely.

Memory-metal actuator wire 107 is readily available "off the shelf" (such wires are available from Dynalloy, Inc. of Newport Beach, Calif.). All other things being equal, the larger the diameter of wire which is used, the greater the force generated when the wire is heated, and consequently the more readily the memory-shaped wire overcomes the mechanical and friction forces resisting its action. The faster the wire is heated to transition temperature the sooner the wire will move. Put another way, increasing current flow increases the speed of actuation. However, even with unlimited power availability the relative slow speed of cooling can limit the usefulness of large diameter wires since they may return to position more slowly than the application requires, since, everything else is equal, large diameter wires cool more slowly than small diameter wires. As well, large wire diameters generally have low electrical resistance and require substantial electrical current for actuation. In addition, all other things being equal, the length of the wire loop used can be changed to affect its travel and force properties. Increasing shape-memory lengths, however, increases the assembly's space requirement, and the overall size of the assembly can become impractical. Thus, even without limits on power availability, multiple strands of relatively thin memory-metal wire acting in parallel are often better than a single long strand of large diameter wire. For the foregoing reasons, persons skilled in the art will readily understand that the shape-memory wire, or wires, must be chosen which have suitable dimensions in order to match: 1) the assembly's force and operating requirements, 2) the limitations of the power supply, and 3) the speed of the movements required.

For most portable, battery-powered applications-such as in toys or hand-held devices-actuator wires sized from about 0.001" diameter to about 0.006" diameter are preferred. These preferred wire sizes heat quickly (from ohmic heating) to the required transition temperature with the current flow induced from connection to battery-power supplies. Preferably a 4.5 volt (V) or greater power supply is used since this voltage provides sufficient current to heat the shape-memory wire quickly, especially wire sizes less than 0.002" in diameter. Preferably voltages greater than 3 V should be used for wire sizes 0.002" diameter and above, but in some instances 1.5 V power supplies can be used. In situations where larger diameter memory-metal wires (diameters above about 0.006") or strips-or assemblies with more than a few strands of small diameter wire-greater current flow than portable batteries-of hand-held size, at least-typically supply, are required. In these situations conventional household or industrial power (typically employing a voltage-step-down transformer) or automotive generator power can be used so long as the voltage (or current) supplied is properly matched to the wire size. Memory-metal wire manufacturers, such as Dynalloy of Newport Beach, Calif., can provide detailed specifications for matching voltage (or current) requirements, speed of action, cooling techniques and wire size.

The extent, or amount, of lever movement, or rotation, around the bend point, or locus of flexure, can be controlled by the point of application, 106, of the memory-metal wire along lever arm 101 as well as by the total length of the shape-memory-material loop used. Loop formed by the actuator wire 107 and cantilevered lever arm 101 form, in effect, a third-class lever. Thus, knowing the pivot point, or locus of flexure shown in area 108, point of application 106 and the length of cantilevered lever arm 101, the "moment arm" can be calculated. As well, greater forces can be obtained by making multiple loops of shape-memory-material wire, so that assemblies capable of overcoming large resistive forces can constructed according to the principles of the present invention. Assemblies constructed in the spirit and scope of the present invention can be made with shape-memory springs, rods or thin strips, or wires with non-circular cross sections in place of round memory-metal wires.

While lever-arm 101 can be made from one of a plurality of other resilient materials well known in the art, it is preferably constructed of high-grade music wire. However, whichever material is chosen, lever-arm spring material is preferably resistant to fatigue from repeated flexures. The diameter of the music wire preferred in making lever arm 101 is larger in diameter, preferably 5 to 8 times the diameter of the memory-metal actuator wire. Lever-arm 101 also is preferably configured to achieve about 3 to 6 times stroke amplification. In other words, end shown in area 115 preferably moves 3 to 6 times the distance that memory-metal loop formed in actuator wire 107 contracts. Lever-arm 101 is preferably arched, or curved, in shape as well. Among other things, lever arm's preferred arch shape permits it to clear pivot 121 during reciprocal motion. The preferred "M" form, indicated in area 108, fabricated in a portion of cantilevered lever arm 101 help define locus of the bend, or flexure, of lever arm 101.

Cantilevered lever arms with forms alternative to the preferred "M" form can be constructed according to the principles of the present invention and still achieve its objectives. For example, the area 108, the locus of the bend or flexure, of lever arm 101 can be made as a loop, or coil, and still achieve the principles of the present invention.

Sleeve 105 is preferably made from rugged, high-temperature plastic. Teflon shrink tube, which can be obtained from Radio Shack, is preferred. Sleeve 105 preferably acts to cushion the wire at point of application, located approximately as indicated by point of application 106. As well, sleeve 105 increases the effective diameter of the bend radius of the memory-metal loop. Sharp bends, i.e. loop diameters less than about 20 times the diameter of memory-metal wires, can lead quickly to their stress fracture or breakage during flat motor operation. Sleeve 105 consequently should be thick enough to create an adequate bend radius for the loop of memory-metal. Sleeve 105, although presently preferred for ease of assembly, can be eliminated since the memory-metal wire can be directly attached to lever arm 101, using lever arm 101 as a conductor to complete the electrical circuit and the assembly will function within the spirit and scope of the present invention When constructed according to the principles of the present invention, lever arm 101 will tend to beneficially absorb the shock of the memory-metal actuator wire 107 contractions during flat motor operation. As well, persons skilled in the art will understand readily that lever arm 101, made according to the principles of the present invention, will yield, or flex, if the motion of crank 117 is blocked, easing what otherwise would be substantial stress on the wire of loop formed by actuator wire 107—stress substantial enough to quickly lead to fatigue or breakage of loop formed by actuator wire 107. If motion of crank 117 is hindered, or restrained, the arch of resilient lever arm 101 will tend to flatten causing point of contact shown in area 115 between lever arm 101 and crank 117 to slide out away from pivot 121, substantially increasing the effective length of the "moment arm" formed by point of contact shown in area 115 and pivot 121, while only moderately increasing the moment of lever arm 101 with respect to point of application 106—thus temporarily increasing the torque provided. Once the hindrance, or restraint, is overcome, lever arm 101 will tend to "spring" back to a fully-arched shape and point of contact shown in area 115 will tend to return to a "normal" position in power-stroke cycle. Accordingly, flat motor 100, when constructed according to principles of the present invention, will act to respond to different torque requirements during operation.

Figure 2:
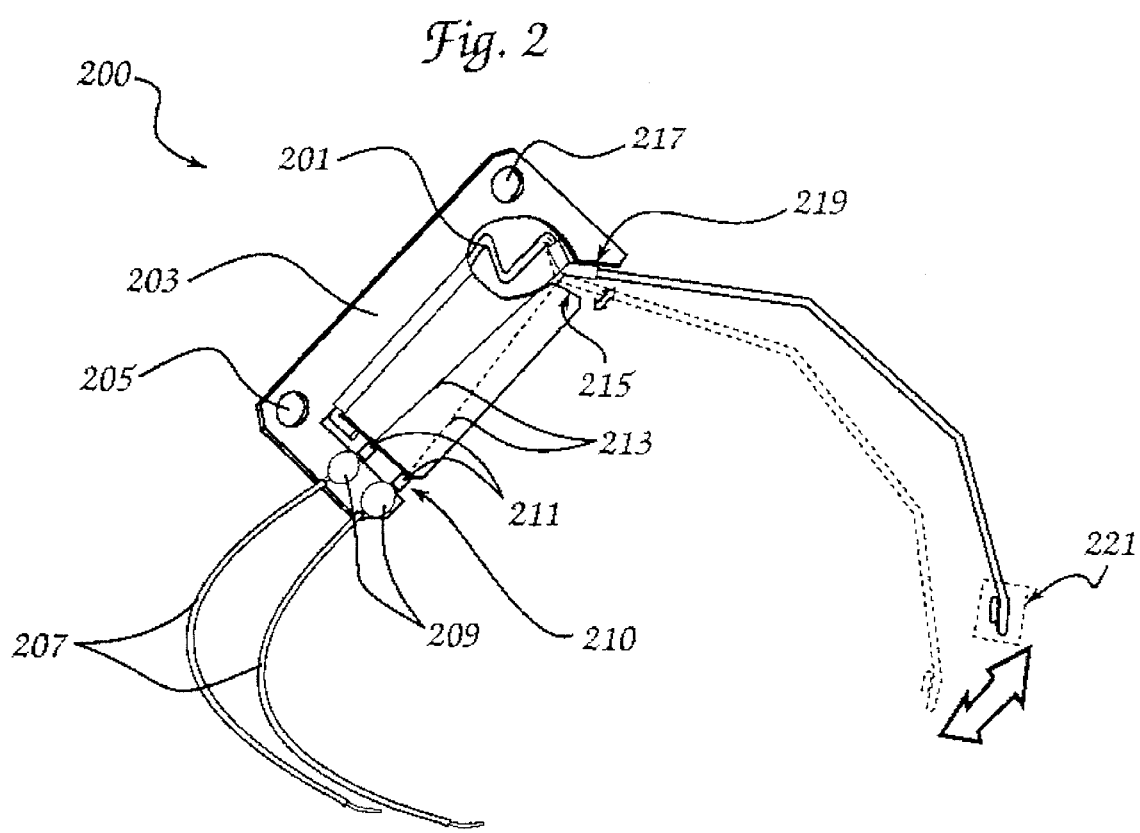
FIG. 2 is a perspective view of a flat solenoid-like mechanism in accordance with the present invention.

Referring now to FIG. 2, a second embodiment of the present invention, generally designated as flat motor 200 is shown. Cantilevered, resilient lever arm 201, is constructed in the manner described earlier with regard to lever arm 101 in FIG. 1 and is mounted in, or on, a structure 203. Support structure 203 is preferably fabricated from structural plastic such as 6/6 Nylon (a trademark of DuPont Co., Wilmington, Del.), from folded sections of rigid paper card-stock, or from conventional circuit-board material. It is preferred that support structure 203 be made fire retardant, which can be accomplished by conventional means well known in the art, such as using fire-retardant additives in support-structure fabrication. Mounting holes 205 and 217 are preferably fabricated in support structure 203 so that flat motor 200 can be affixed to a main support means in use. Memory-metal loop 213 is constructed according to the principles of the present invention described earlier with regard to flat motor 100. Similarly as with embodiment of flat motor 100, a loop of memory-metal wire, 213, is attached to lead wires 207 by means of crimps 211 and glued or attached to support structure 203 as designated by 209. A preferred mounting glue is cyanoacrylate, available from Radio Shack. Slot 210 is formed in the support structure 203 to further hold crimps and a right-angle portion of lever arm 201 in place. Active end designated by 221 can be formed in a loop shape as in embodiment of flat motor 100 above or in any of a numberof shapes some of which will be described below and a plurality of other shapes, or constructions, as are well known in the art. Support structure 203 is also preferably constructed with stops 215 and 219 which limit travel of lever arm 201 and prevent over-stretching or disengagement of actuator wire loop 213. A plurality of flat or thin solenoid-like devices can be constructed in accordance with the principles of the present invention. Moreover, since non-magnetic memory-metal materials are readily available (e.g. NiTi memory-metal materials are generally non-magnetic), by employing non-magnetic materials for all the moving parts of flat motor 200, including lever arm 201, solenoid-like embodiments of the present invention can be fabricated which will function nominally even in the presence of strong magnetic fields. Furthermore, tiny actuator devices can be constructed, according to the principles of the present invention, using very small diameter wires for both the memory-metal loop and lever arm. Thus, a plurality of flat solenoid-like devices can be constructed, within the spirit and scope of the present invention, by simply modifying memory-metal and lever-arm wire sizes, choosing a suitable mounting structure, and determining—among a multiplicity well known in the art—the desired shape for active end 221. Accordingly, actuator devices constructed according to the principles of the present invention can easily be fabricated small enough to fit in the body of wrist watch, for example. Other embodiments of the present invention could be made large and strong enough to power automotive windshield wipers, for example. Still other preferred embodiments of the present invention are described more fully below.

Figure 3:
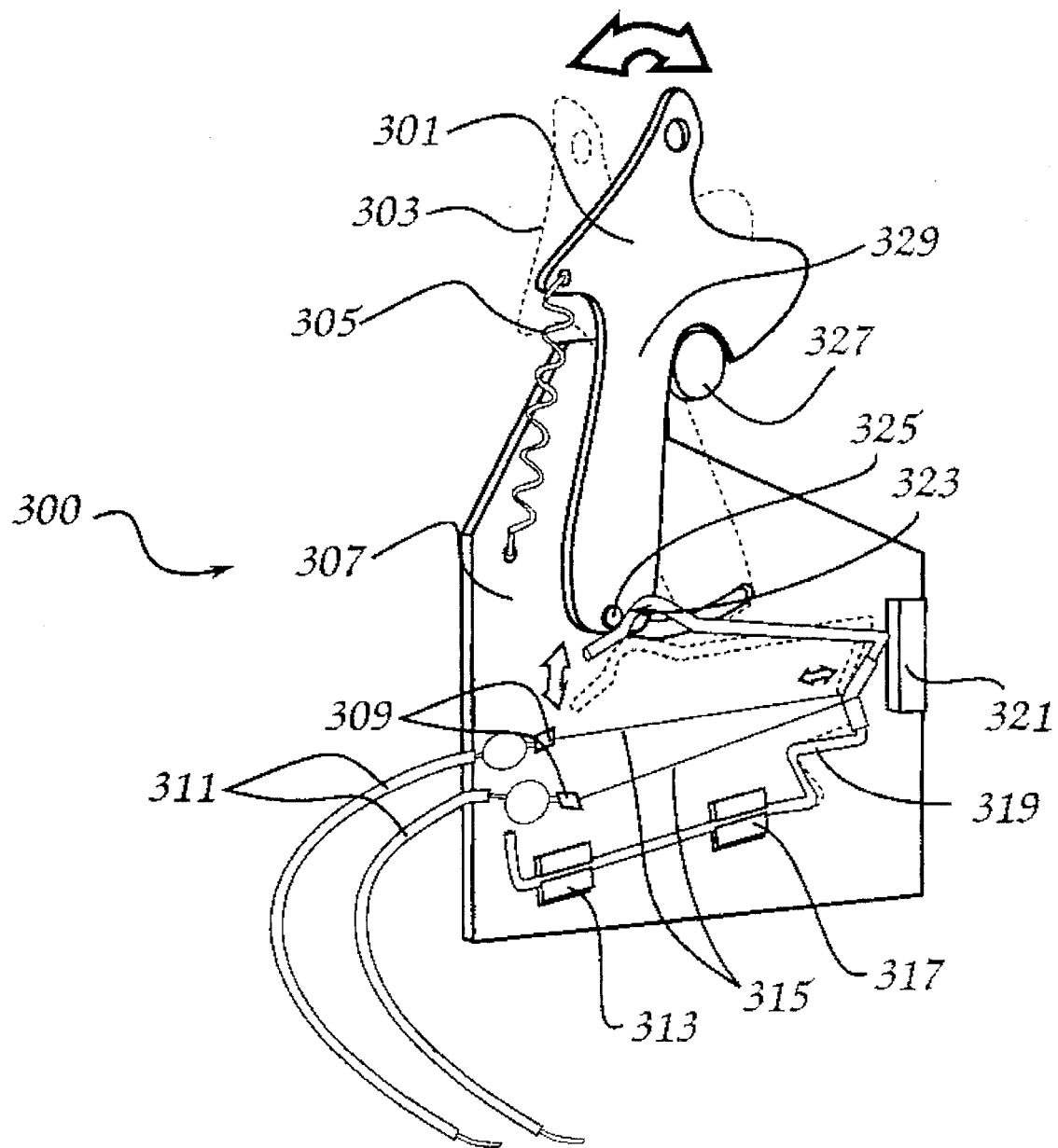
FIG. 3 is a perspective view of a flat latch-release mechanism in accordance with the present invention.

Referring now to FIG. 3, a third embodiment of the present invention, a latch-release mechanism, generally designated as flat motor 300 is shown. Support structure 307 is made in the same manner as is structure 111 in FIG. 1. Cantilevered lever arm 319, except for modifications as described more fully below, is constructed in the manner described earlier with regard to resilient lever arm 101 in FIG. 1 and is mounted on support structure 307 by mechanical means, 313 and 317, as is well known in the art. Memory-metal wire 315 is looped around lever arm 319 and held in place under tension by crimps 309 which, in turn, are mounted on support structure 307 and connect to wire leads 311. Latch 301, which is mounted to support structure 307 by pivot 329, engages shaft 327. Shaft 327 moves in a direction which is approximately parallel to the base of support structure 307. A multiplicity of locations for use of flat motor 300 such as when shaft 327 is mounted on, or part of, a gate or door means, e.g. on a vending machine. Lever arm 319 is fabricated to form a curved section 323 which engages against pin 325 on latch 301, holding latch arm closed until released by action of lever arm 319. Spring 305 is mounted between support structure 307 and latch 301 and is in tension when the latch arm is closed around shaft 327. Block 321 acts to support and prevent over-travel of lever arm 319.

Latch-release begins when memory-metal wire 315 is energized with a pulse of electric current or when it is otherwise warmed to its transition temperature. Lever arm 319 moves in response and curved section 323 moves to release pin 325. Spring 305 acting on latch 301 moves it to position shown in dotted outline 303. Shaft 327 is then released. The latch mechanism flat motor 300 is "re-set" when shaft 327 is re-engaged with latch 301, causing pin 325 to ride up and over the curved section 323 of lever arm 319 which, in turn, "springs" back to hold pin 325 in the "latched" position.

A plurality of thin or flat latch release mechanisms can be made constructed according to the principles of the present invention. Furthermore, mechanisms can also be fabricated to very small and operate in unusual environments such as ones with high magnetic fields. Moreover, latch-release mechanisms of flat motor 300, fabricated according to the principles of the present invention, can be employed to release at pre-selected elevated temperatures, e.g. as latch-releases for a fire door in a building or structure.

Figure 4:
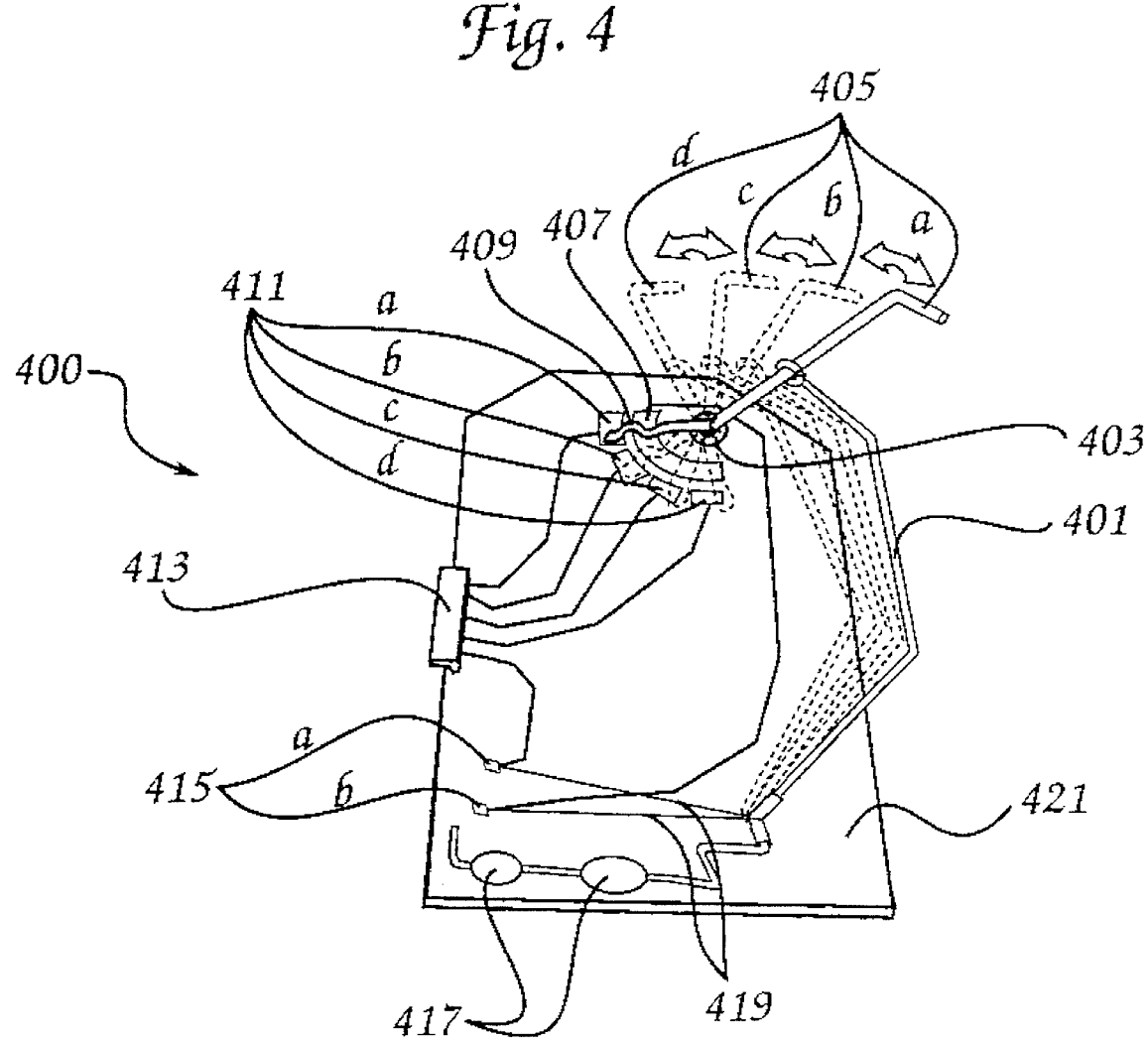
FIG. 4 is a perspective view of a flat multi-position "stepper" mechanism in accordance with the present invention.

Referring now to FIG. 4, a fourth embodiment of the present invention, a multi-position "stepper" mechanism, generally designated as flat motor 400 is shown. Support structure 421 is made in the same manner as is structure 111 in FIG. 1, preferably as a conventional circuit board. As well, arm 401 is constructed in the manner described earlier with regard to resilient lever arm 101 in FIG. 1 and is mounted on a structure 421. Arm 401 is mounted by mechanical means or preferably by glue, 417, to structure 421. A preferred mounting glue is cyanoacrylate, available from Radio Shack. In the manner described earlier with regard in FIG. 1, crimps 415 and memory-metal loop 419 are mounted. Pivot 403 and crank 405 are also constructed in the manner described earlier with regard to pivot 121 and crank 117, respectively, in FIG. 1. Wiper arm 409, which is connected to rotate in concert with crank 405, makes simultaneous contact with sector 407 and successively with arc segments 411a through 411d, depending on the extent of rotation, or position, of crank 405. Crank 405 is shown in starting position 405a and in dotted outline form in positions 405b through 405c. Sector 407 and arc segments 411 are preferably exposed conductors, of a conventional circuit board. Connector 413 is also shown mounted on board 421 and electrically connected to crimp 415a, though memory-metal loop 419, 415b and sector 407, and then selectively to each individual arc segment 411a through 411c by means of conductive wiper arm 409. Each arc segment, 411a through 411c, is separated from the other by a narrow, non-conductive gap. Wiper arm is 409 is fabricated to be less than the width of an individual arc segment but wide enough to "bridge" each one of the narrow, non-conductive gaps between the arc segments of 411.

Flat motor 400 is operated by closing the electrical circuit from 415a and then successively to each element 411a through 411d. The position of crank 405 will quickly "step" when the circuit is engaged in this manner. When arc segment 411a and 441b is powered, crank 405 will move to position 405b, to 405c if 411a through 411c are energized, and so forth. In each instance, wiper arm 409 will tend to move so that it is barely in contact with the last energized arc segment. The number of arc segments can be increased for even finer control of crank position. Concentric rings of conductors of differing arc lengths will function in place of individual arc segments. Furthermore, electric switching can occur manually by connecting conventional switches to connector 413 or by electronic switching circuitry fabricated on the circuit board. Additionally, a plurality of thin, lightweight, multi-position devices can be constructed according to the principles of the present invention. For example, multi-position mechanisms, constructed within the spirit and scope of the present invention, could be integrated with radio-control circuitry, in the creation of inexpensive, lightweight control systems for models and toys. As well, other multi-position mechanisms, also constructed within the spirit and scope of the present invention, could be employed pointing or indicating systems in instruments or gauges.

Figure 5:
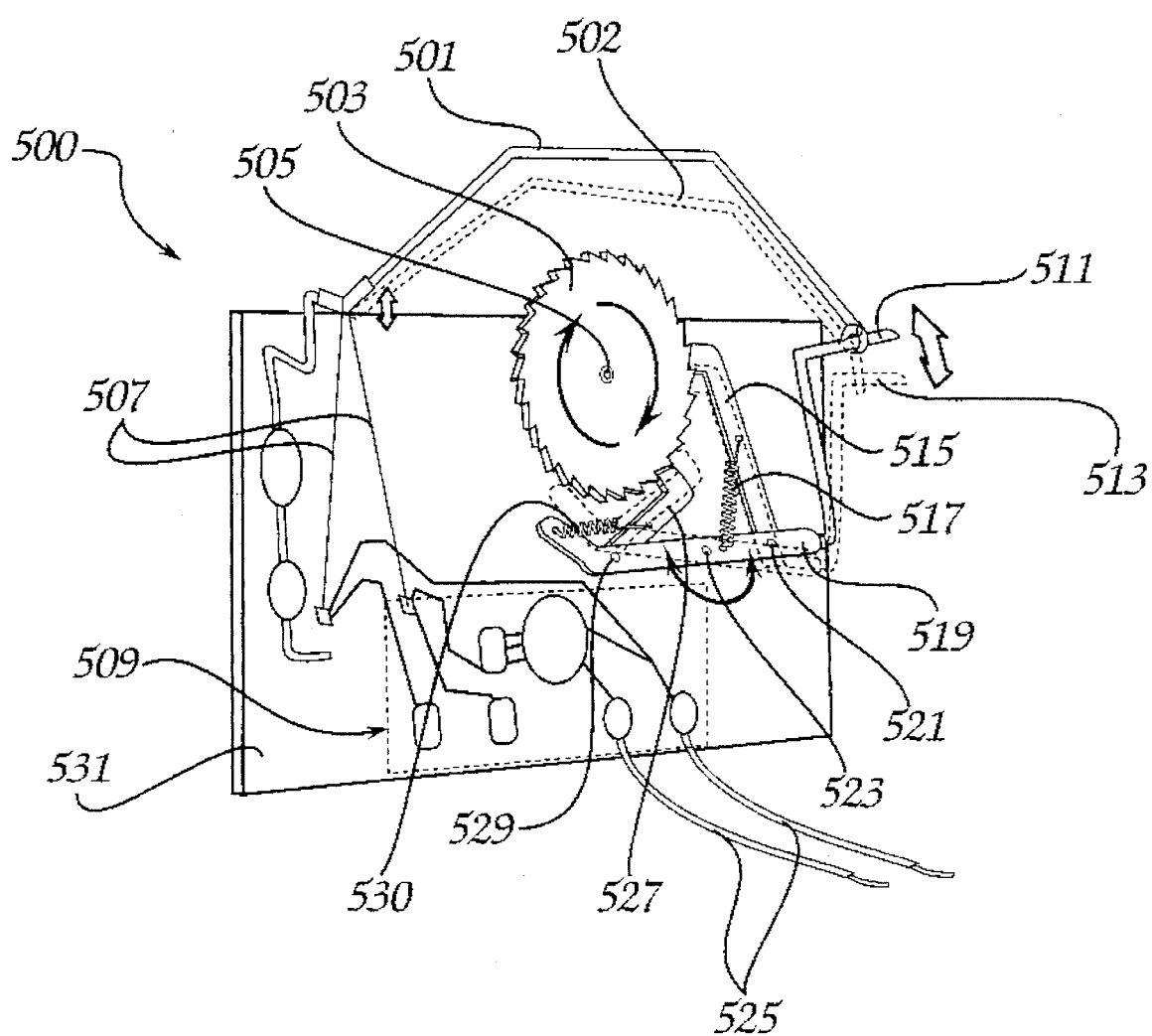
FIG. 5 is a perspective view of a flat continuously-rotating sprocket-wheel mechanism in accordance with the present invention.

Reference is now made to FIG. 5, a fifth embodiment of the present invention, a continuously-rotating sprocket-wheel mechanism, generally designated as flat motor 500. Support structure 531 is made as is structure 111 in FIG. 1, preferably as a conventional "printed" circuit board. As well, arm 501 is constructed in the manner described earlier with regard to lever arm 101 in FIG. 1 and is similarly mounted on a support structure 531. While any of a multiplicity of materials are possible and well known in the art, sprocket wheel 503 is preferably fabricated from structural plastic such as 6/6 Nylon, made by DuPont Corporation. Pivot 505 and crank 511 are also constructed in the manner described earlier with regard to pivot 121 and crank 117, respectively, in FIG. 1.

Arm 501 is mounted by mechanical means, by solder or preferably by cyanoacrylate glue to support structure 531. In the manner described earlier with regard in FIG. 1, crimps and memory-metal loop 507 are mounted as well. Finger arms 515 and 527, which rotate about pivots 521 and 529 respectively, are held in place against sprocket wheel 503 by springs 517 and 530, respectively. Finger arms, 515 and 527, via pivots 521 and 529 are mounted on bracket 519. Bracket 519, connected to crank 511, turns about pivot 523, which, in turn, is mounted to support structure 531.

Electrical circuit shown in dotted area 509 is constructed in the manner described with regard to timing circuit shown in area 123 in FIG. 1. Also in the same manner as flat motor 100 in FIG. 1, electrical leads 525 are connected to a power source.

Flat motor 500 will function indefinitely, in the manner of flat motor 100, so long as electric power is supplied to the circuit which provides timed pulses of electric power to periodically ohmically heat memory-metal wire loop 507. Memory-metal loop 507 by alternately contacting and relaxing causes cantilevered, resilient lever arm to move back and forth between the position shown for solid arm 501 and position shown by dotted outline 502. Thus finger arms 515 and 527 alternately power sprocket wheel 503, one after the other in turn. On the "down" stroke, i.e. crank moving from position 511 to the position shown for dotted crank 513, finger arm 515, engages and turns sprocket wheel 503 clockwise. While this occurs, finger arm 527 slides up and over a sprocket of wheel 503. On the "up" stroke, i.e. the crank is moving back from the position shown for dotted crank 513 to the position shown for solid crank 511, finger arm 527 engages and turns a sprocket of wheel 503 while finger arm 515 returns to the position shown for solid crank by sliding up and over another sprocket.

A plurality of thin, light-weight, sprocket-wheel, or ratchet, devices can be constructed according to the principles of the present invention.

Figure 6:
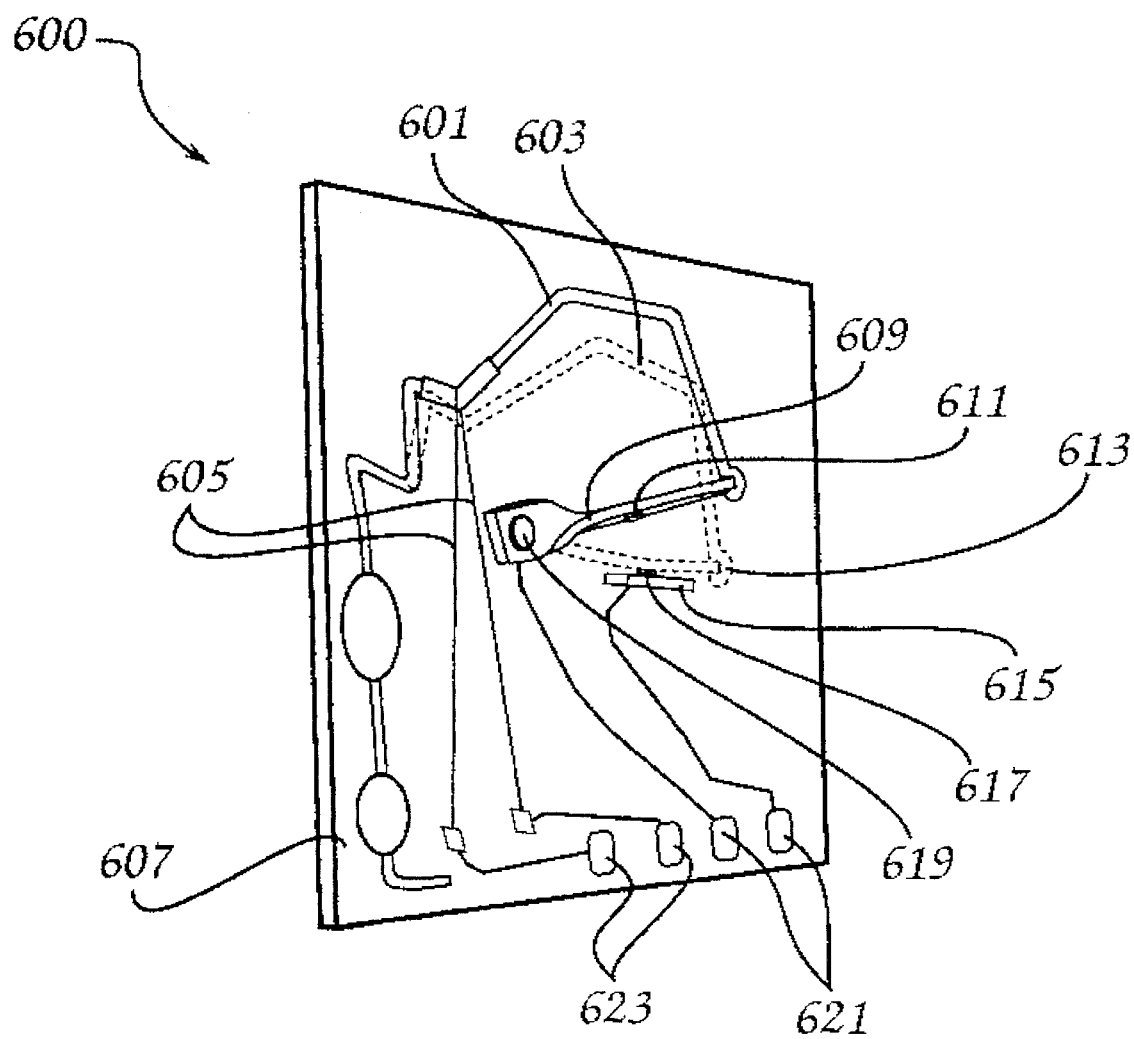
FIG. 6 is a perspective view of a flat relay mechanism in accordance with the present invention.

Referring now to FIG. 6, a sixth embodiment of the present invention, a relay mechanism, generally designated as flat motor 600 is shown. Support structure, preferably constructed as conventional circuit board, 607 is made as in structure 111 in FIG. 1. Cantilevered lever arm 601, except for modifications as described more fully below, is constructed in the manner described earlier with regard to resilient lever arm 101 in FIG. 1, and is mounted on support structure 607 by means of glue or preferably by "double-stick" tape available from Radio Shack. Memory-metal wire 605 is looped around lever arm 601 and held in place under tension by crimps which are mounted on support structure 607 and connect to wire leads 623.

Conductive arm 609, on which electrical contact 611 is affixed, is in turn mounted by means of pivot 619 to support structure 607. Conductive bracket 615, on which electrical contact 617 is mounted, is also affixed to support structure 607. Both pivot 619 and conductive bracket 615 is preferably mounted by means of conventional soldering to support structure 607. Electrical contacts 611 and 617 are preferably plated, by any conventional means, to prevent oxidation during use. Conductive arm 609 is preferably mounted under tension with cantilevered lever arm 601. As is well known in the art, tensioning is preferably aligned toward pivot 619 so as to create an "over-center" or "snap" action when lever arm 601 is moved to position shown by dotted lever arm 603.

When electric power is supplied via circuit positions 623, memory-metal loop is ohmically warmed and cantilevered lever arm 601 moves to position shown in dotted outline 603. This action, in turn, causes contacts 611 and 617 to "close" by movement of conductive arm 609, which is connected to lever arm 601 and shown by dotted lever arm 603. Conductive arm 609 and bracket 617 can be fabricated and mounted in a plurality of conventional ways all within the spirit and scope of the present invention.

Electrical contacts 611 and 617 are shown in the "normally-open" position, creating a "open," circuit by connecting to positions 621. While a "normally-open" configuration is illustrated, flat motor 600 can be configured to be "normally-closed." Additional brackets can be mounted on support structure 607 in order to create form "C" relay-circuit pattern, as well as a multiplicity of other relay-circuit patterns, all within the spirit and scope of the present invention. Accordingly, a plurality of flat relay devices can be constructed in accordance with the principles of the present invention. Moreover, since many common shape-memory materials are non-magnetic, as described more fully above with regard to flat motor 200, flat relay devices, all within the spirit and scope of the present invention, can be fabricated which will function in the presence of strong magnetic fields.

Referring now to FIGS. 7a and 7b, a preferred embodiment, flat motor 100, is shown employed in animation of a flat display panel or picture. Shown in FIG. 7a, flat motor 100 is mounted on back of display panel, or picture, 711, by glue or preferably by conventional "double-stick" tape available from most hardware or artist-supply outlets. Display panel or picture 711 is preferably backed by card board or foam board. Battery pack 705 is connected to leads 125 and mounted, in the same manner as flat motor 100, to the back of panel 711 as well.

Referring now to FIG. 7b, the front of display panel 711 is shown. Powered by reciprocating action of flat motor 100, hand 707 moves to position 709, shown as a dotted outline. Hand 707 is fabricated of lightweight card stock, printed on front, and affixed to crank 117. The motion of crank 117 to position shown in dotted outline 119 is shown in FIG. 7a. The motion of crank 117 corresponds to motion of the hand 707 as best seen in FIG. 7b. Within the spirit and scope of the present invention, a plurality of figures or picture elements can be animated in the manner illustrated by FIGS. 7a and 7b.

Reference is now made to FIG. 8a, a preferred embodiment, flat motor 200, shown employed in animation of a flat, trading-card-like amusement device. FIG. 8a shows the reverse side of device 800 without back 817. Shown in FIG. 8a, flat motor 200 is mounted on back of printed card-stock, or picture mounted on thin cardboard, 801, glued at points 803. A preferred mounting glue is cyanoacrylate, available from Radio Shack.

Flat motor 200 is connected to printed circuit board 807 by leads 805. Circuit board 807 contains a timing circuit which, except for modifications noted below, is made in the manner described above with reference to timing circuit shown in area 123 in FIG. 1. Activation button 809, a conventional tact switch available from most electronic supply outlets, e.g. Radio Shack, is added to the timing circuit and used as an on/off power switch. Also on circuit board 807 are battery "button" cells 811, small 1.5 V alkaline cells, which are mounted by conventional means. Battery "button" cells 811 are also available from most electronic supply outlets, e.g. Radio Shack.

Shown for illustrative example in dotted outline form in FIG. 8a, is picture 802, a figure printed on card stock. Mouth tab 813 is mounted to lever arm 201. Mouth tab 813 is inserted into slot 815 so as to extend through from the reverse to the front of printed card 801. Different appearances of card 801 during movement of mouth tab 813 are illustrated in FIGS. 8b and 8c, respectively. Clear plastic cover 819 is mounted preferably by conventional glue on top of card 801. Cover 819 can be made of acrylic or other clear plastic and is constructed so as to permit free movement of mouth tab 813 and activation of button 809. Back 817 is fabricated of any rigid plastic such as ABS plastic, which is commonly available from a multiplicity of plastic-supply outlets. Back 817 can be glued in place, using cyanoacrylate glue, on the back of printed card 801. As well, back 817 and clear plastic cover 819 can be made of injected-molded parts, fitting together as a snap-together box. Amusement device 800 is activated by depressing button 809, causing the figure printed on card 801 to appear to become animated.

Within the spirit and scope of the present invention, a plurality of figures or picture elements can be animated in the manner illustrated by FIGS. 8a, 8b and 8c. While motion of mouth tab printed on cardstock is illustrated in FIGS. 8a, 8b and 8c, "bas-relief" plastic parts, "cut-out" cardboard parts of photographic "baseball cards" as well as a plurality of similar elements can be animated all within the spirit and scope of the present invention. As well, greeting cards, flat wrist watches, toys, books and book covers and plurality of flat printed or photographic display or advertising media can be animated in a like manner according to the principles of the present invention. Moreover, animated combinations of moving elements and "sound-sync'd" mouth movements, within the spirit and scope of the present invention, are easily achieved by employing conventional microprocessor circuits or similar control elements as are well known in the art. Such control elements are readily available from electronic-supply outlets such as Radio Shack.

Figure 9:
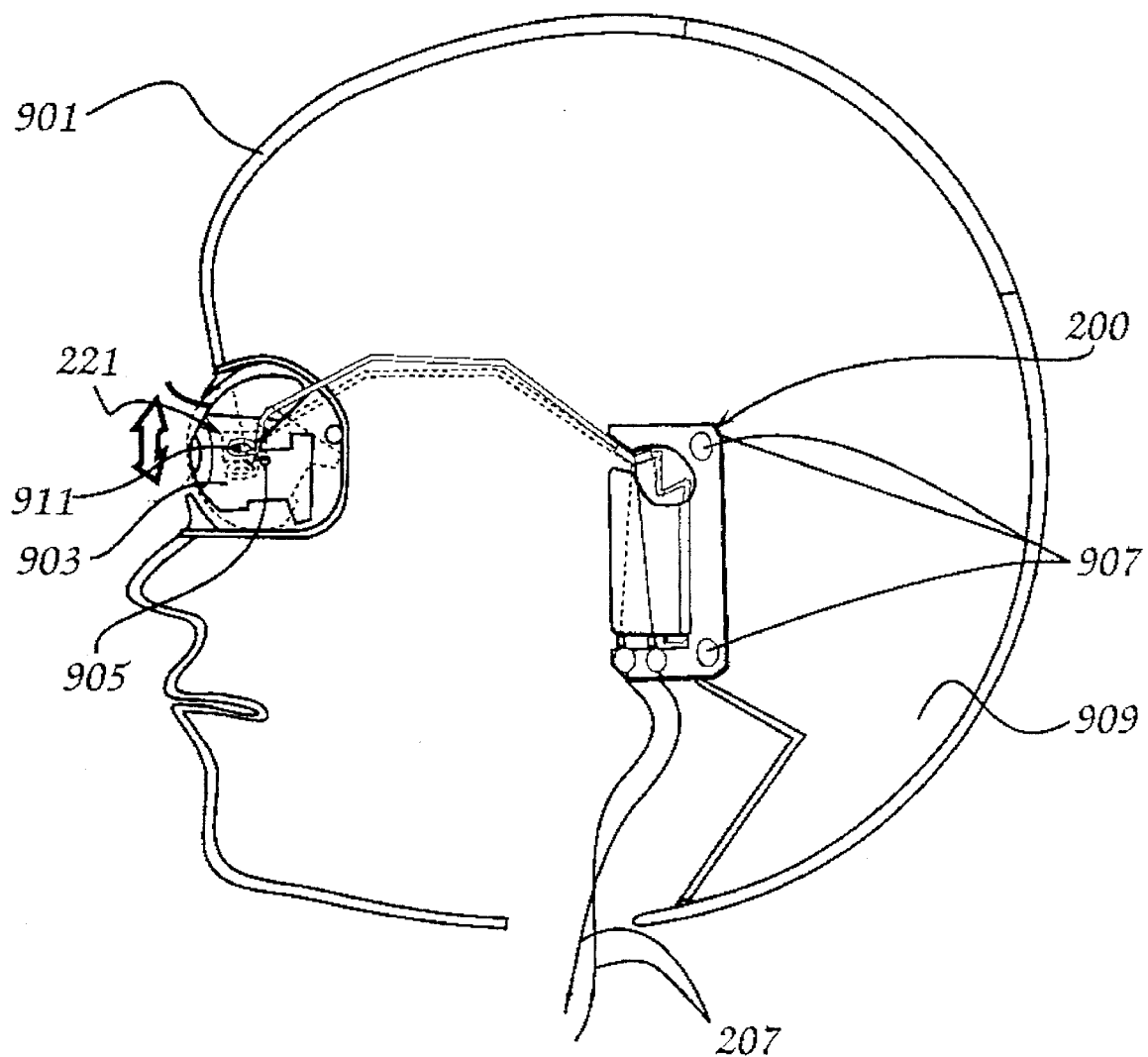
FIG. 9 is a cross-sectional view of a doll's head showing a preferred embodiment, a solenoid-like device, used in animating the doll's eye in accordance with the present invention.

Reference is now made to FIG. 9, in which a preferred embodiment, flat motor 200, is shown employed in animation of a doll's eye. FIG. 9 shows a cross-section view of a doll's, or toy figure's, hollow head 901 and a pivoted eye 903, rotating on pivot 905. Both hollow head 901 and eye 903 can be constructed by conventional means well known in the art or adapted from available parts. Hollow head 901 is preferably made of roto-cast vinyl, as is well known in the art. The doll's eye is made of painted, injection-molded polypropylene or preferably adapted from eyes made by manufacturers such as Tak Mei Eyeball Factory, Yau Tong Bay, Kowloon, Hong Kong. Flat motor 200 is mounted on protrusion 909, fabricated as part of head 901. Flat motor 200 is preferably glued at points indicated by 907 so as to affix it in place. Suitable vinyl glue is available from most hardware or artist-supply outlets. The "active end" 221 of flat motor 200 engages pin 911 mounted on the side of the plastic eyeball 903, which in turn rotates about pivot 905. As persons skilled in the art will readily understand, actuator wire must move rapidly in order to produce aesthetically-pleasing eye motion—thus, preferably, 90° C. NiTi actuator wire less than 0.002" in diameter, available from Dynalloy of Newport Beach, Calif. is used in fabricating flat motor 200 so as to achieve realistic motion. A multiplicity of conventional microprocessor circuits or other similar means connected to lead wires 207, in the manner disclosed above with reference to FIG. 8, can be used to control animation of the doll's eye by controlling timing of electric currents to flat motor 200 in a large number of possible patterns and/or in response to a plurality of stimuli. As well, a multiplicity of pivoted, or otherwise moving, parts of toy figures of all kinds can be animated according to the principles of the present invention. For example, mouths of toy ponies can be animated in the according to the principals of the present invention.

Figure 10:
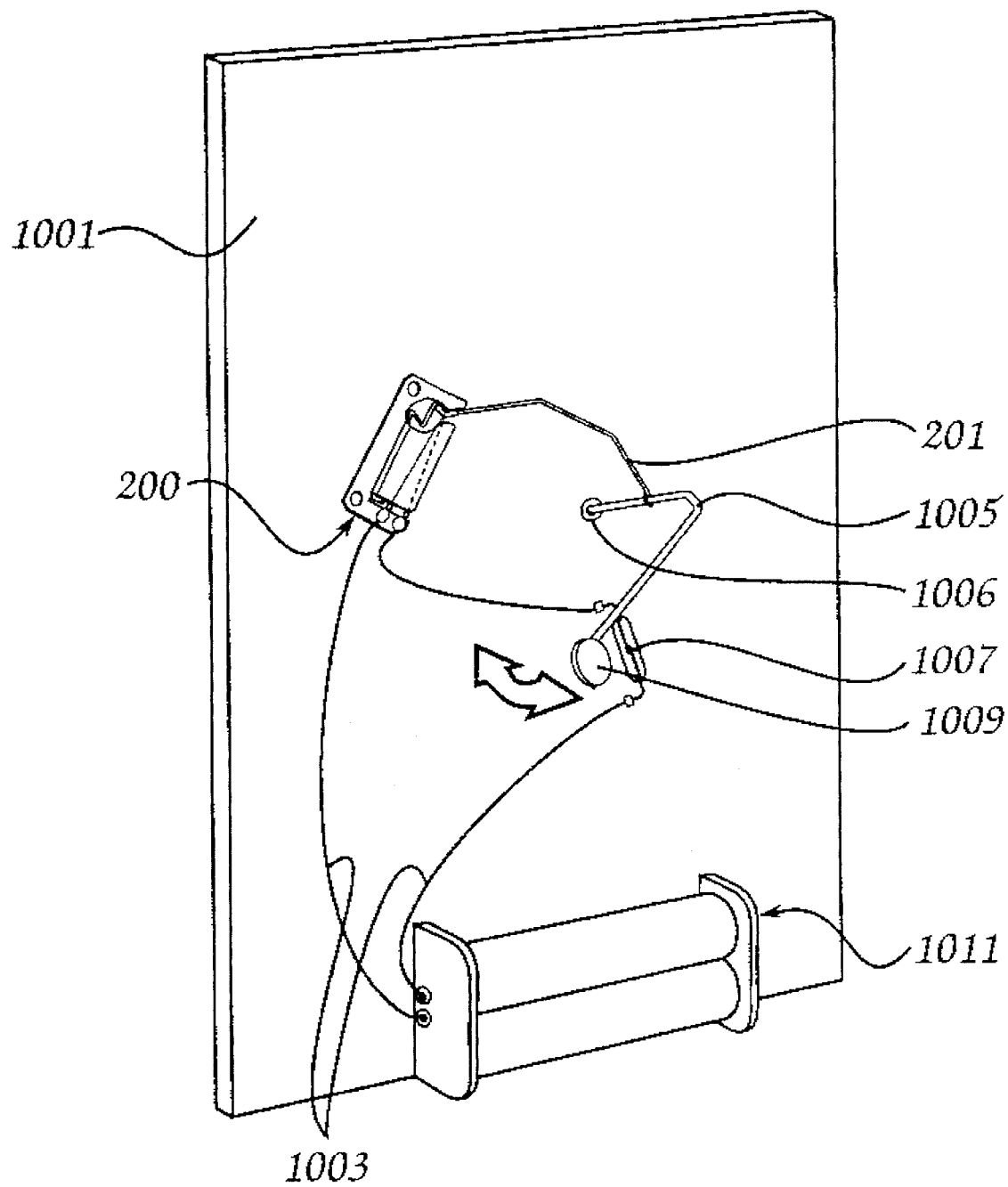
FIG. 10 shows a preferred embodiment of a reed switch and magnet used to oscillate power to a flat solenoid-like device in accordance with the present invention.

Referring now to FIG. 10, a preferred embodiment, flat motor 200, is shown employed in animation of a flat display panel or picture. Flat motor 200 is mounted on back of display panel, or picture, 1001, by glue or preferably by conventional "double-stick" tape available from most hardware or artist-supply outlets. Display panel or picture 1001 is backed by card board or preferably foam board. Battery pack 1011 is connected to leads 1003 and mounted, in the same manner as flat motor 200, to back of panel 1001 as well.

In the same manner as in FIG. 7a, crank 1005 is mounted through pivot 1006 extending through panel 1001. Lever arm 201 is slipped over crank 1005. Permanent magnet 1009 is mounted on the free end of crank 1005 preferably by epoxy glue or other suitable means well known in the art. A common "normally-open" reed switch, 1007, available from most electronic-supply outlets, is spliced in series with one of leads 1003. During device set up and before electric power is engaged, magnet 1009 is positioned, by bending crank 1005, if need be, into a position near but not touching reed switch so that magnet 1009 activates reed switch 1007 when the apparatus is in rest position. Minor adjustments necessary in the spatial position of magnet 1009 with respect to reed switch 1007 so as to achieve the switching necessary for back and forth "swings" of crank 1005. As well, a multiplicity of reed-switch, pivot and permanent-magnet arrangements can employed, all within the spirit and scope of the present invention, in order to modify patterns of movements or to achieve additional movements on the front side of picture or display panel 1001.

Referring now to FIG. 11a, a preferred embodiment of the present invention, a covered rotary actuator, generally designated as flat motor 1100, is shown with the top portion of housing 1101 cut away so that the internal mechanism is visible in plan view. FIG. 11b and 11c show back and side views, respectively, of the exterior of rotary actuator mechanism of flat motor 1100. Referring to FIG. 11a, cantilevered lever arm 1135, is constructed in the manner described earlier with regard to cantilevered, resilient lever arm 101 in FIG. 1 and is mounted on housing 1101. While assembly from injection-molded plastic parts is feasible, housing 1101 is preferably fabricated from stainless-steel or zinc-plated metal stampings. Such stampings can be made by conventional means well known the art. Mounting tubes 1107 are preferably fabricated from brass and affixed by conventional means to housing 1101. Sleeve 1103 is mounted on arm 1135 in the manner of sleeve 105 in FIG. 1. Memory-metal loop 1105 is constructed according to the principles of the present invention described earlier with regard to flat motor 100, in FIG. 1. Also in the manner described with regard to embodiment 100 in FIG. 1, a loop of memory-metal wire, 1105, is attached to solder lugs 1113 by means of crimps 1109 and leads 1112. Both crimps 1109 and leads 1112 are affixed to structure 1111 by conventional means also well known in the art. Structure 1111 is preferably a small circuit board fabricated by conventional means also well known in the art. Structure 1111 is fabricated with preferably at least three spring-mounting holes 1115. Biasing spring 1117 is connected, under tension, to crank 1127 and to one of the spring-mounting holes. Biasing spring 1117 is a small, common extension spring, available in hardware-supply outlets or from manufacturers such as Century Spring of Los Angeles, Calif. Biasing spring should be selected for proper size as well as for resistance to fatigue. Furthermore, biasing spring 1119 is not necessarily required for device operation, but that is useful as a "helper" to partially offset loads or balance objects attached to and moved by crank 1127. Spring-mounting holes 1115 enable adjustment of biasing-spring tension. While balance weights can be employed, the use of a spring is a preferred biasing means since it creates less inertia than a counter weight for the same balancing effect. Accordingly when constructed according to the principles of the present invention, the addition of a biasing means, such as a small conventional extension spring, will permit the substitution of thinner, more efficient actuator wires, in place of larger-diameter actuator wires, thereby reducing power consumption and/or increasing the speed of action over that otherwise possible.

Housing 1101 is preferably constructed with stops 1129 and 1121 which limit travel of lever arm 1135 to a maximum extent indicated by crank 1127 in dotted outline form 1123, as lever arm 1135 moves to position 1133. Limiting travel prevents over-stretching or disengagement of memory-metal loop 1105. Slot 1125 is fabricated on the base of housing 1101 in the same manner as pivot mounting holes, 122, described in FIG. 1. When such a slot is employed according to the present invention, the crank's pivot location can be changed and, in turn, the extent of crank rotation as well as the amount of torque provided can be adjusted easily. Hole 1131 is one of several holes fabricated in the substrate for mounting it to a surface. Pivot 1119, as can be best seen in FIG. 11c, is fabricated of a nut 1137 and bolt 1139. Both nut 1137 and bolt 1139 are preferably made of 6/6 Nylon, a trademark of DuPont Corporation. The nut portion of pivot 1119 can be loosened so as to permit adjustment of position of bolt 1139 along slot 1125. Bolt 1139 has an axial hole which permits passage of the end of crank 1127 through its length.

Rotary actuator flat motor 1100 is actuated in the manner described with regard to flat motor 100, in FIG. 1. A plurality of flat rotary actuator flat motors can be constructed in accordance within the spirit and scope of the present invention, by simply modifying memory-metal and lever-arm wire sizes. As well, according to the principles of the present invention, the size of the external housing can be modified within a wide range from smaller in diameter than a U.S. "dime" to larger than a U.S. "silver dollar."

The foregoing description should not be read as pertaining only to the precise structure, as described and shown in the accompanying drawings, but rather should be read consistent with and as support to the following claims which have their fullest and fair scope.

What is claimed is:

1. A flat motor comprising:

a substrate;

a cantilevered lever arm mounted, by a first end, on the substrate; and a shape-memory transducer acting on the cantilevered lever arm wherein movement of the transducer deflects the cantilevered lever arm.

2. A motor as recited in claim 1 wherein the cantilevered lever arm is arched in shape.

3. A motor as recited in claim 1 further comprising:

a crank pivotally attached to the substrate; and the cantilevered lever arm attached to the crank to thereby rotate the crank.

4. A motor as recited in claim 1 further comprising an electrical circuit to power the memory transducer and to regulate deflection of the cantilevered lever arm.

5. A motor as recited in claim 1 further comprising limit stops to prevent overstretching of the shape-memory transducer.

6. A motor as recited in claim 1 further comprising:

a latch; and a second end of the cantilevered lever arm which engages the latch to thereby release the latch when the transducer is activated.

7. A motor as recited in claim 3 further comprising:

an electrically conductive strip attached to the substrate;

a plurality of electrically conductive elements attached to the substrate adjacent to the strip; and a wiper arm attached to the crank wherein the wiper arm bridges the strip and the elements to complete an electrical circuit with the shape memory transducer to thereby move the crank to a preselected position.

8. A motor as recited in claim 1 wherein the cantilevered lever arm engages and activates a sprocket.

9. A motor comprising:

a substrate;

a cantilevered lever arm mounted, by a first end, on the substrate;

a shape-memory transducer acting on the cantilevered lever arm wherein movement of the transducer deflects the cantilevered lever arm;

a latch; and second end of the cantilevered lever arm which engages the latch to thereby release the latch when the transducer is activated.

10. A motor comprising:

a substrate;

a cantilevered lever arm mounted, by a first end, on the substrate;

a shape-memory transducer acting on the cantilevered lever arm wherein movement of the transducer deflects the cantilevered lever arm;

an electrically conductive strip attached to the substrate;

a plurality of electrically conductive elements attached to the substrate adjacent to the strip; and a wiper arm attached to the crank wherein the wiper arm bridges the strip and the elements to complete an electrical circuit with the shape-memory transducer to thereby move the crank to a preselected position.

11. A motor comprising:

a substrate;

a cantilevered lever arm mounted, by a first end, on the substrate;

a shape-memory transducer acting on the cantilevered lever arm wherein movement of the transducer deflects the cantilevered lever arm;

a bracket attached to the cantilevered lever arm;

finger arms attached to the bracket; and a sprocket wheel wherein the finger arms engage the sprocket wheel.

* * * * *